United States Patent
Saverskiy (10) Patent No.: US 9,867,271 B2
(45) Date of Patent: Jan. 9, 2018

(54) SOURCE FOR INTRA-PULSE MULTI-ENERGY X-RAY CARGO INSPECTION

(71) Applicant: American Science and Engineering, Inc., Billerica, MA (US)

(72) Inventor: Aleksandr Saverskiy, North Andover, MA (US)

(73) Assignee: American Science and Engineering, Inc., Billerica, MA (US)

( * ) Notice: Subject to any disclaimer, the term of this patent is extended or adjusted under 35 U.S.C. 154(b) by 0 days.

(21) Appl. No.: 15/307,463

(22) PCT Filed: May 14, 2015

(86) PCT No.: PCT/US2015/030716
§ 371 (c)(1),
(2) Date: Oct. 28, 2016

(87) PCT Pub. No.: WO2015/175751
PCT Pub. Date: Nov. 19, 2015

(65) Prior Publication Data
US 2017/0055338 A1    Feb. 23, 2017

Related U.S. Application Data

(60) Provisional application No. 61/994,484, filed on May 16, 2014.

(51) Int. Cl.
*H05H 7/02*      (2006.01)
*H01J 35/14*      (2006.01)
(Continued)

(52) U.S. Cl.
CPC .............. *H05H 7/02* (2013.01); *H01J 35/14* (2013.01); *H05H 7/08* (2013.01); *H05H 9/04* (2013.01);
(Continued)

(58) Field of Classification Search
CPC .......... G01V 5/0041; G21K 5/00; H05G 2/00; H05H 9/02; H05H 2007/084;
(Continued)

(56) References Cited

U.S. PATENT DOCUMENTS 5,168,241 A * 12/1992 Hirota .................. H05H 7/18
                                         315/500
7,646,851 B2    1/2010   Liu
(Continued)

FOREIGN PATENT DOCUMENTS

EP        0 672 332 B1    2/2000  .............. H05H 9/00
JP        2013-51156 A    3/2013  .............. H01J 35/08

OTHER PUBLICATIONS

Gijeong Jang, Authorized officer Korean Intellectual Property Office, International Search Report—Application No. PCT/US2015/030716, dated Jul. 29, 2015, 11 pages, together with the Written Opinion of the International Searching Authority.
(Continued)

*Primary Examiner* — Wyatt Stoffa
(74) *Attorney, Agent, or Firm* — Novel IP (57) ABSTRACT

Methods for generating a multiple-energy X-ray pulse. A beam of electrons is generated with an electron gun and modulated prior to injection into an accelerating structure to achieve at least a first and specified beam current amplitude over the course of respective beam current temporal profiles. A radio frequency field is applied to the accelerating structure with a specified RF field amplitude and a specified RF temporal profile. The first and second specified beam current amplitudes are injected serially, each after a specified delay, in such a manner as to achieve at least two distinct endpoint energies of electrons accelerated within the accelerating structure during a course of a single RF-pulse. The beam of electrons is accelerated by the radio frequency field within the accelerating structure to produce accelerated electrons
(Continued)

which impinge upon a target for generating Bremsstrahlung X-rays.

16 Claims, 7 Drawing Sheets

(51) Int. Cl.
*H05H 7/08* (2006.01)
*H05H 9/04* (2006.01)
*H01J 35/00* (2006.01)
*H05G 2/00* (2006.01)
*G01V 5/00* (2006.01)

(52) U.S. Cl.
CPC ............. *G01V 5/0041* (2013.01); *H01J 35/00* (2013.01); *H05G 2/00* (2013.01); *H05H 2007/025* (2013.01); *H05H 2007/084* (2013.01)

(58) Field of Classification Search
CPC ...... H05H 2007/025; H05H 7/02; H05H 7/08; H05H 7/12; H05H 9/04; H01J 35/14
See application file for complete search history.

(56) References Cited

U.S. PATENT DOCUMENTS

| | | | | |
|---|---|---|---|---|
| 8,284,898 B2* | 10/2012 | Ho | ............................ | H05H 7/12 |
| | | | | 315/505 |
| 8,457,274 B2 | 6/2013 | Arodzero | | |
| 8,604,723 B2 | 12/2013 | Chen | | |
| 9,622,333 B2* | 4/2017 | Nighan, Jr. | ............... | H05H 7/02 |
| 2007/0140422 A1* | 6/2007 | Elyan | ....................... | H01J 35/14 |
| | | | | 378/57 |
| 2007/0170375 A1 | 7/2007 | Tang et al. | .................. | 250/493.1 |
| 2008/0211431 A1* | 9/2008 | Mishin | ..................... | H05H 9/00 |
| | | | | 315/505 |
| 2010/0066256 A1* | 3/2010 | Meddaugh | ............... | H05H 7/12 |
| | | | | 315/156 |
| 2010/0188027 A1* | 7/2010 | Treas | ....................... | H05H 7/02 |
| | | | | 315/505 |
| 2012/0081042 A1* | 4/2012 | Cheung | .................... | H05H 7/02 |
| | | | | 315/505 |
| 2012/0206069 A1* | 8/2012 | Zavadtsev | ................ | G21K 5/04 |
| | | | | 315/501 |
| 2012/0294423 A1* | 11/2012 | Cheung | .................... | H05H 7/02 |
| | | | | 378/65 |
| 2013/0016814 A1* | 1/2013 | Treas | ....................... | H05H 7/02 |
| | | | | 378/106 |
| 2013/0063052 A1* | 3/2013 | Ho | ........................... | H05H 7/12 |
| | | | | 315/505 |
| 2014/0029725 A1 | 1/2014 | Ueda et al. | ..................... | 378/62 |
| 2014/0211919 A1 | 7/2014 | Ogura et al. | .................... | 378/62 |
| 2014/0270086 A1* | 9/2014 | Krasnykh | ................ | H05G 2/00 |
| | | | | 378/124 |

OTHER PUBLICATIONS

Ogorodnikov et al., "Processing of interlaced images in 4-10 MeV dual energy customs system for material recognition", Phys. Rev. Special Topics—Accelerators and Beam, vol. 5, 104701 (2002).
Krasnykh et al., "Concept of RF Linac for Intra-Pulse Multi-Energy Scan", SLAC Pub-15943, (Apr. 18, 2014).
Miller, "Comparison of Standing-Wave and Travelling-Wave Structures", SLAC Linear Accelerator Conferernce, (1986).
Gao, "Analytical formula for the coupling coefficient Beta of a cavity waveguide coupling system", Physics Research A, vol. 309, pp. 5-10 (1991).

* cited by examiner

SOURCE FOR INTRA-PULSE MULTI-ENERGY X-RAY CARGO INSPECTION

The present application claims the priority of U.S. Provisional Application Ser. No. 61/994,484, filed May 16, 2014, and incorporated herein by reference in its entirety.

TECHNICAL FIELD

The present invention relates to systems and methods for inspection of cargo using penetrating radiation, and, more particularly to systems and methods for material discrimination on the basis of varying both the energy and the flux of incident radiation during the course of a single pulse.

BACKGROUND OF THE INVENTION

Discrimination of materials has become a standard requirement for security inspection systems. An inspection system for cargo and containers screening typically employs an electron accelerator capable of interlaced dual energy operation, and differential transmission of X-rays characterized by distinct energy spectra can be used to distinguish among intervening materials of different atomic numbers. The term "interlaced energies," as employed herein, denotes the use of a stream of X-ray pulses wherein successive pulses are characterized by distinct energy spectra. The use of interlaced energy inspection for material discrimination is well known, with processing techniques surveyed, for example, by Ogorodnikov et al., *Processing of interlaced images in 4-10 MeV dual energy customs system for material recognition*, Phys. Rev. Special Topics—Accelerators and Beams, vol. 5, 104701 (2002), and in references cited therein, all of which are incorporated herein by reference. A Bremsstrahlung spectrum is characterized by its endpoint energy, defined by the energy of electrons impinging upon an X-ray target in order to generate the X-rays. Attenuation by an inspected object of transmitted radiation for two (or, on some occasions, more) distinct energies provides the input data for identifying the type of material being inspected.

Various techniques are known for generating X-rays of interlaced energies based on electron accelerators, such as described, for example, in U.S. Pat. No. 7,646,851, entitled "Device and Method for generating X-Rays Having Different Energy Levels and Material Discrimination System," and U.S. Pat. No. 8,604,723, entitled "Interlaced multi-energy radiation sources," both of which are incorporated herein by reference. The technologies of interlaced energy irradiation merit no further discussed here, since they are irrelevant to the present invention, other than to highlight their deficiencies for purposes of cargo inspection.

Several limitations accompany material discrimination functionality when a source of interlaced X-ray energy is employed. Using two pulses separated in time for producing one inspection data point effectively reduces inspection speed. Moreover, while the basic assumption of dual-energy techniques is that the same region of the cargo is being probed by both energies, it must be borne in mind that the cargo and the probe are typically in relative motion. Interlaced energy approaches are thus only tenable for slow moving cargo.

Figure 1:
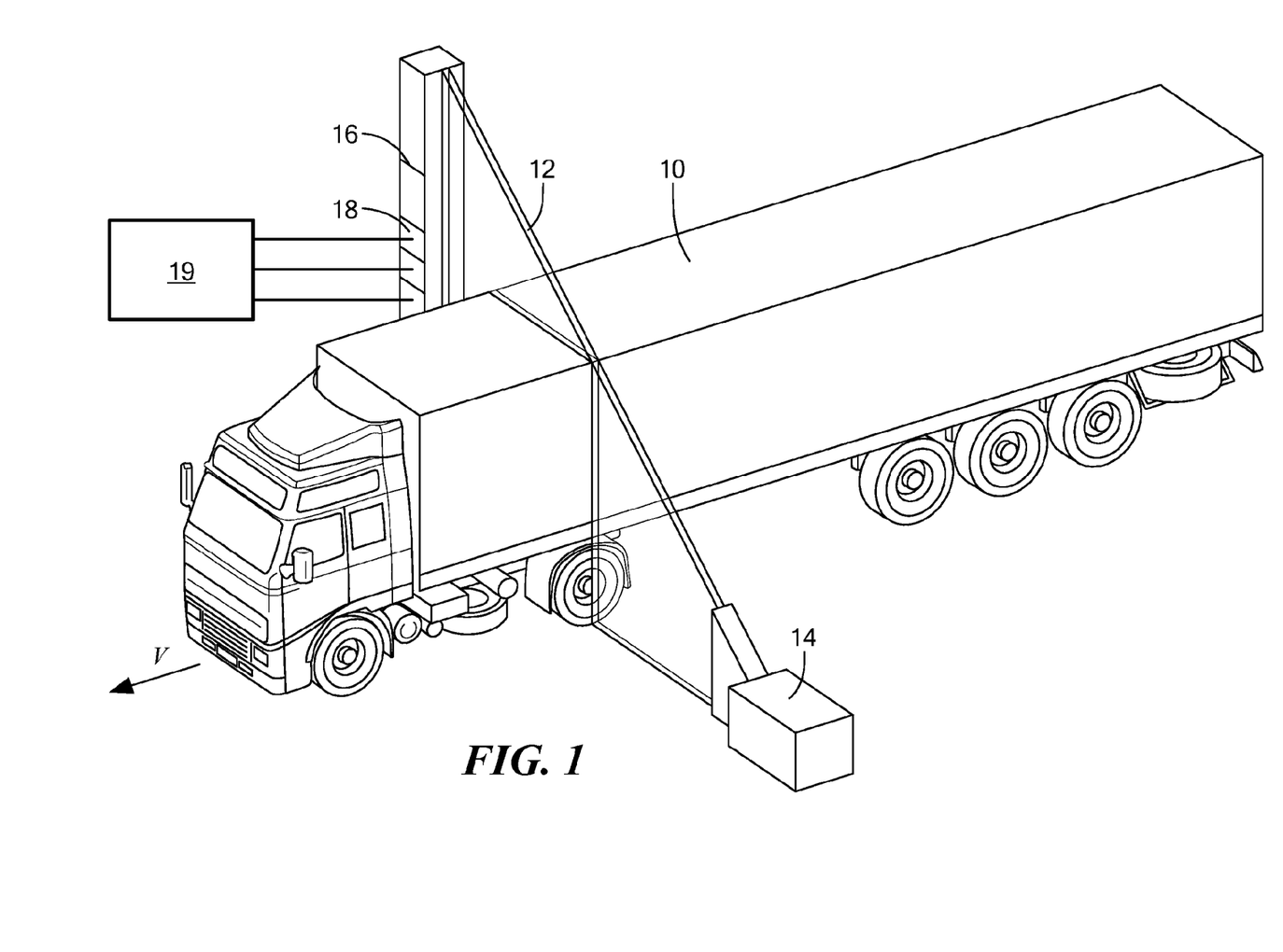
FIG. 1 depicts a typical high-energy transmission X-ray inspection system, in the context of which embodiments of the present invention are advantageously applied.

X-ray security inspection systems for the inspection of cargo and shipping containers typically use transmission radiographic techniques. FIG. 1 depicts a cargo inspection system employing such a technique. A fan-shaped beam 12 of penetrating radiation, emitted by a source 14, is detected by elements 18 of a detector array 16 distal to a target object, here truck 10, is used to produce images of the target object. Detector elements 18 produce corresponding detector signals processed by processor 19 to provide information relative to the material composition of the cargo and images of its spatial distribution. The thickness of material to be penetrated by the X-rays may exceed 300 mm of steel equivalent in some cases. To insure the required penetration, inspection systems typically use X-rays with a maximum energy of several MeV, currently up to about 9 MeV. X-rays in excess of 1 MeV are frequently referred to as hard X-rays or high-energy X-rays. While the invention described herein pertains to any penetrating radiation, it may be described, purely as a matter of heuristic convenience, in terms of high-energy X-rays.

Information (such as mass absorption coefficient, effective atomic number $Z_{eff}$, electron density, or the spatial distribution of any of the foregoing, etc.) with respect to the material composition of the contents of objects may be obtained on the basis of the interaction of X-rays with the material, and, more particularly, by illuminating the material with X-ray beams having energy spectra with more than one distinct energy endpoint (peak energy), or by employing energy discriminating detectors. Dual energy methods of material discrimination are widely used in X-ray inspection systems for security control of hand luggage in customs and other security checkpoints.

Dual (and, more generally, multiple-) energy methods have been extended to high-energy inspection systems for cargo containers, where material discrimination is less effective due to the weaker Z-dependence of the dominant interaction.

In the practice of dual-energy inspection, X-ray transmission data of an inspected object are obtained for both energies, and processed by computer, whereupon a resulting image is displayed on a monitor, typically in a special color palette that facilitates visual identification of contraband or hazardous materials. More particularly, special computer software may identify various materials and artificial colors may be assigned to various values of $Z_{eff}$.

A typical energy range for the inspection of smaller objects is below 0.5 MeV, taking advantage of the strong Z-dependence of the X-ray attenuation coefficient due to the prevalence of the photoelectric interaction (characterized by a cross-section, $\sim Z^4$-$Z^5$) at lower energies. In the range of 1-10 MeV, however, X-ray interaction is dominated by the Compton effect with its weak dependence of attenuation coefficient (mass absorption) on the atomic number: $\mu_c \sim Z/A$ (which is approximately constant and equal to 0.5), where Z denotes atomic number, and A denotes atomic mass, which is to say that the mass absorption coefficient is largely Z-insensitive in the energy regime dominated by Compton scatter.

A preferred method for material discrimination entails variation of the pulse energy during the course of each single pulse, as described in detail in U.S. Pat. No. 8,457,274 ("Arodzero '274", issued Jun. 4, 2013), which is incorporated herein by reference.

Leó Szilárd conceived of the linear accelerator (linac) in 1928, while a professor at the University of Berlin. A linac was also constructed independently by Rolf Widerøe, then an engineering graduate-student under Walter Rogowski at Aachen, at about the same time. Electrons accelerated by a linear accelerator were first used to generate X-rays at Stanford in the mid-1950's.

Some prior art methods for varying the emitted energy during the course of a pulse have required that the x-ray flux track the end-point energy. The Arodzero '274 Patent, for example, states that "Concurrently with the sweeping of the endpoint energy, the X-ray flux may increase from a minimum to a maximum." (Arodzero '274, col. 6, lines 47-48.)

US Published Patent Application 2014/0270086 (to Krasnykh), incorporated herein by reference, describes an intra-pulse multi-energy method that uses a traveling wave accelerator structure. It suggests the use of feedback to the electron gun grid voltage to compensate for X-ray flux variation during the course of a pulse. Krasnykh et al., *Concept of RF Linac for Intra-Pulse Multi-Energy Scan, SLAC Pub*-15943, (Apr. 18, 2014) provides further description, and is also incorporated herein by reference. The prior art mode of operation, however, could not accommodate separate tailoring of the flux and end-point energy of an X-ray pulse, even though such operation would be highly advantageous in a cargo inspection context, for example.

One of the limiting factors of inspection speed is RF-power available for accelerating. The maximum pulse repetition frequency (PRF) that a linac-based X-ray source can provide is limited by the RF source. The RF source (typically, a magnetron or a klystron) has limitations on maximum average $P_{av,max}$ and pulsed $P_{p,max}$ power. These two parameters define the maximum duty factor $d_{max}$, which also can be expressed in terms of PRF (f) and pulse duration $t_p$:

$$d_{max} = \frac{P_{av,max}}{P_{p,max}} = f \cdot t_p. \quad (1)$$

For example, where a single energy (SE) (non-interlaced) accelerator, characterized by $P_{p,max}$, is chosen to produce the high energy (HE) pulse, with $t_p \approx 3.3$ μs and $d_{max} \approx 0.001$, the maximum PRF would be limited to $f_H \approx 300$ Hz (pps).

For a dual-energy interlaced linac, the maximum available frequency can be estimated from the equation $$f_{DE} \approx \frac{P_{av,max}}{P_H \cdot t_p \cdot \left(1 + \frac{P_L}{P_H}\right)} = \frac{f_H}{\left(1 + \frac{P_L}{P_H}\right)}, \quad (2)$$

where $P_H$ and $P_L$ represent the RF power necessary to produce high (HE) and low (LE) energy pulses, respectively. If the assumption is made that $t_p$ remains the same for both energies, and that $P_H = P_{p,max}$, then, for $P_L = P_H$ (RF-power remaining constant for both pulses, achieved, for example, by RF-switches/regulators, manipulation of beam loading, and phase-shifting of the accelerating field), $f_{DE} = \frac{1}{2} \cdot f_H$. That is to say, that a dual energy repetition rate of, at best, half that of the single-energy rate, may be achieved. On the other hand, if the low-energy pulses produce only half the power of the high-energy pulses, $P_L = \frac{1}{2} P_H$, (as might be implemented using RF-generator power supply modulation, for example), then $f_{DE} = \frac{2}{3} \cdot f_H$, which is to say that ⅔ of the single-energy pulse rate may be achieved on an interlaced energy basis.

In prior practice, both the RF-power and the injected beam were turned on at the same time ($t_b = 0$). The result of such prior art practice is shown by the dotted curve 30 plotted in FIG. 3, which represents the beam energy W vs. time t for a 6-MeV accelerating structure designed for security applications. The filling time, which is the time it takes for the electric field in the accelerator structure to decay to $e^{-1}$ of its initial value, is $t_{f,95\%} \approx 1$ μs.

A well-known technical solution for reducing the filling time was described by Roger Miller, *Comparison of Standing-Wave and Travelling-Wave Structures*, SLAC Linear Accelerator Conference, SLAC-PUB—3935, pp. 216-21 (1986) (hereinafter, "Miller (1986)", which is incorporated herein by reference. The Miller solution allows for creating the beam pulse with constant energy over the pulse duration. The accelerating beam turns on with delay $t_b$ that is defined as:

$$t_b = \tau \cdot \ln\left(\frac{\sqrt{4\beta rLP}}{IrL}\right). \quad (3)$$

β is the coupling coefficient between an RF power feed waveguide 222 (shown in FIG. 2) and an accelerating structure 22 (shown in FIG. 2, also referred to herein as an "accelerating cavity structure"), r is the shunt impedance of the accelerating structure 22, L is the length of the accelerating structure 22, and P is the power dissipated in the accelerating structure 22, and τ is the decay time constant of the accelerating structure 22. (Thus, both numerator and denominator of the logarithmic argument have units of voltage.) Rigorously, β is defined as the ratio of power lost outside the accelerating cavity structure 22 (i.e., in the feed waveguide 222) to the power dissipated inside the accelerating cavity structure 22. If $\beta = \beta_0$ has been adjusted so that there is no RF-power reflection from the accelerating structure 22 when the beam 220 is on, the above equation can be cast as:

$$t_b = \tau \cdot \ln\left(\frac{2 \cdot \beta_0}{\beta_0 - 1}\right) \quad (4)$$

where $\beta_0$ is the optimum coupling coefficient, $$\beta_0 = \left(\frac{I}{2}\sqrt{\frac{rL}{P}} + \sqrt{1 + \frac{I^2}{4}\frac{rL}{P}}\right)^2, \quad (5)$$

and τ, as above, is the decay time constant of the accelerating structure 22.

As known to persons of ordinary skill in the art, the coupling coefficient of the accelerating structure 220 (also referred to as an "accelerating resonator," or a "resonator," or "RF accelerating structure") to the external circuit (feeding waveguide 222) depends on the current accelerated in (and interacting with) the resonator 220. Typically, the presence of current decreases the coupling coefficient that is measured through VSWR (voltage standing wave ratio), and the phase of the reflected signal from the resonator 220. Initially (without current), the resonator 22 needs to be over-coupled and to have a coupling coefficient of greater than β=1. The optimum coupling coefficient $\beta_0$ is a value that allows the resonator 22 to be matched with an external waveguide 222 at the accelerating current I. When the coupling coefficient β is equal to $\beta_0$, the coupling is referred to herein as "optimal." An exact calculation of the optimum $\beta_0$ may be found by reference to Sobenin et al., *Electrodynamic Characteristics of Accelerating Cavities* (Eng. trans.), CRC Press, particularly at p. 121 (Eqn. 4.49), (1999), Collin,

*Foundations for Microwave Engineering*, McGraw-Hill, (1$^{st}$ ed., 1992), and Gao, *Analytical formula for the coupling coefficient β of a cavity waveguide coupling system, Physics Research A*, vol. 309, pp. 5-10 (1991), all of which are incorporated herein by reference.

SUMMARY OF EMBODIMENTS OF THE INVENTION

In accordance with embodiments of the present invention, a method is provided for generating a multiple-energy X-ray pulse. The method has steps of:
 a. generating a beam of electrons with an electron gun;
 b. modulating the beam of electrons prior to injection into an accelerating structure to achieve at least a first specified beam current amplitude and a first specified beam current temporal profile, and a second specified beam current amplitude and a second specified beam current temporal profile, the beam of electrons characterized by an electron beam pulse duration;
 c. applying to the accelerating structure a radio frequency field with a specified RF field amplitude and a specified RF temporal profile characterized by an RF pulse duration;
 d. injecting the beam of electrons with the first specified beam current amplitude and then with the second specified beam current amplitude after a specified delay, in such a manner as to achieve at least two distinct endpoint energies of electrons accelerated within the accelerating structure during a course of a single RF-pulse;
 e. optimizing a coupling coefficient between an RF source and the accelerating structure so as to achieve zero RF power reflection at the specified beam current;
 f. accelerating the beam of electrons with the radio frequency field within the accelerating structure to produce accelerated electrons; and
 g. impinging the accelerated electrons upon a target for generating Bremsstrahlung X-rays.

In accordance with alternate embodiments of the present invention, the electron beam pulse duration may be shorter than the RF pulse duration by a sum of onset delays defined by a filling time of the accelerating structure. The first specified beam current temporal profile and the specified RF temporal profile may begin substantially contemporaneously. The beam of electrons may be characterized by an amplitude of injection current, the amplitude of which may decrease during the multiple-energy X-ray pulse.

In accordance with further embodiments of the present invention, an end-point energy characterizing the beam of electrons may increase during the multiple-energy X-ray pulse. Applying the RF field may include modulating an RF source, such as by varying at least one of an input voltage and an input current to the RF source. Applying the RF field may also include modulating an RF modulator disposed between an RF source and the accelerating structure while the RF-source provides a constant level of power at constant frequency. A high-energy portion of the multiple-energy X-ray pulse may be characterized by a lower electron beam flux than a low-energy portion of the multiple-energy X-ray pulse.

In accordance with yet further embodiments of the present invention, the accelerating structure may include a standing wave resonator. The RF source may provide a constant level of RF-power; and a temporal profile of the electron gun may be characterized by at least two distinct levels of the amplitude of electron beam $I_n$, wherein each amplitude of the at least two distinct levels of amplitude is created in temporally descending order and wherein the coupling coefficient of accelerating resonator $\beta_0$ is chosen to be optimal at a first level of beam current $I_1$. Breaking points, as defined below, pertaining to at least two distinct levels may include dynamically variable breaking points.

In accordance with other embodiments of the present invention, a first portion of an electron beam current pulse may start with an optimum delay ($t_{b1}$) relative to a to beginning of an RF pulse and end at a specified time ($t_1$), and each successive portion of the electron beam current pulse may be characterized by a distinct level $I_n$ and start with a delay $$t_{bn} = \tau \cdot \ln\left(\frac{I_{n-1}}{I_n}\right)$$

corresponding to an end of a previous pulse $t_{n-1}$, with $\tau$ representing a decay time of the accelerator structure.

In yet other embodiments of the invention, an end point of each pulse $t_n$ may include a dynamically variable end point. There may be additional steps of
 a. supplying an RF-power pulse to the accelerating structure at two distinct energy levels, $P_L$, $P_H$, corresponding, respectively, to low and high energy portions of the beam of electrons;
 wherein an electron gun temporal profile is characterized by two distinct levels of the amplitude of electron beam, $I_L$, $I_H$, corresponding, respectively, to beam current levels for achieving low and high energy portion of the beam of electrons; and
 b. optimizing a coupling coefficient of accelerating resonator $\beta_0$ based upon parameters of the low energy beam.

One additional embodiment of the invention has further steps of:
 a. forming an ascending order of two distinct X-ray energy levels by applying a corresponding ascending sequence of RF-power levels and a descending sequence of injection current pulses;
 b. delaying a low energy component of the pulse by a low energy current delay $t_{bL}$ defined by $$t_{bL} = \tau \cdot \ln\left(\frac{2 \cdot \beta_0}{\beta_0 - 1}\right);$$

and
 c. delaying a high energy component of the pulse by a high energy current delay $t_{bH\_a}$ defined by $$t_{bH\_a} = \tau \cdot \left[\ln\left(\frac{I_L}{I_H}\right) + \ln\left(1 + \frac{2 \cdot \beta_0}{\beta_{0-1}} \sqrt{\frac{P_H}{P_L} - 1}\right)\right].$$

Another additional embodiment of the invention has further steps of:
 a. forming a descending order of two energy levels by applying a corresponding descending sequence of RF-power levels and an ascending sequence of injection current pulses;
 b. delaying a high energy component of the pulse by a high energy current delay $t_{bH}$ defined by equation $$t_{bH} = \tau \cdot \ln\left(\frac{\sqrt{4\beta_0 rLP_H}}{I_H rL}\right);$$

and c. delaying a low energy component of the pulse current delay $t_{bL\_d}$ is defined by $$t_{bL\_d} = \tau \cdot \left[\ln\left(\frac{I_L}{I_H}\right) + \ln\left(1 + \frac{\sqrt{4\beta_0 rLP_H}}{I_H rL}\sqrt{1 - \frac{P_H}{P_L}}\right)\right].$$

BRIEF DESCRIPTION OF THE DRAWINGS

The foregoing features of the invention will be more readily understood by reference to the following detailed description, taken with reference to the accompanying drawings, in which.

DETAILED DESCRIPTION OF EMBODIMENTS OF THE INVENTION

Definitions. The term "multiple-energy" shall refer to an X-ray inspection modality in which differential transmission through a medium by X-rays of distinct spectral composition is used to characterize the medium.

The term "pulse duration," denoted $t_{RF}$, refers to the duration of time that RF excitation is applied to a linac accelerating structure.

The term "breaking point" of a current pulse of duration $t_L + t_H$ has a very specialized meaning herein: It is defined to be the value of $t_L/t_H$, where $t_L$ and $t_H$ refer, respectively, to durations of the current pulse during which an electron beam emitted from an accelerating structure is characterized by low- and high-energies, respectively.

In the case of a current pulse having multiple sub-pulses, any pair of sub-pulses may be characterized by a breaking point that is defined as the value of $t_L/t_H$, where $t_L$ and $t_H$ refer, respectively, to durations of current sub-pulses.

A breaking point of a set of current pulses or sub-pulses shall be said to be "dynamically variable" if the breaking point is adapted to be varied from one pair of current pulses or sub-pulses to another pair of current pulses or sub-pulses. Similarly, and end point of a pulse may also be characterized as "dynamically variable" if the end point is adapted to be varied from one current pulse to another current pulse.

The term "current level," as it pertains to an x-ray source, refers to an average flux of electrons incident upon the target, expressed in milliAmperes (mA), and averaged over a specified duration of time. Unless otherwise indicated, the specified duration over which an average is taken is the duration of a pulse.

The term "current amplitude," as it pertains to an x-ray source, refers to a value of an instantaneous flux of electrons incident upon the target, expressed in mA.

The term "onset delay" refers to a period between application of an RF field to an accelerating structure and injection of a pulse or sub-pulse of electron current into the accelerating structure. Where there are multiple sub-pulses of electron current, then the cumulative onset delays of the respective sub-pulses make up a sum of onset delays.

As used herein, the term "Bremsstrahlung" may be used to denote X-ray emission produced through impingement of high-energy electrons onto a metallic target, and, additionally, the physical process involved in that phenomenology.

The systems and methods described herein may be described in terms of X-rays, however the applicability of the teachings to other spectral ranges is clear, and encompasses, within the scope of the invention, all manner of penetrating radiation.

Various embodiments of the invention described herein employ variation of the spectral content of an X-ray pulse during the course of the pulse to discriminate differences in X-ray transmission of a medium in different energy regimes. Approaches taught in accordance with the present invention are particularly advantageous in cases where high speed of scanning is required, such as train or high-throughput scanners.

In accordance with embodiments of the present invention, a novel apparatus and novel methods are provided that may advantageously create a pulse profile of a multi-energy beam in such a manner that would improve material discrimination while preserving the highest possible scanning speed and allow optimizing dose to cargo and environment.

A novel source of penetrating radiation, designated generally by numeral 20, in accordance with an embodiment of the present invention, is now described with reference to FIG. 2. A linac 21, depicted in FIG. 2, includes accelerating structure 22, and an electron gun 23 serving as an injector of electrons emitted by cathode 235. Used in conjunction with linac 21 are an X-ray target 24, an RF-source 25, an RF-source modulator 26, an RF isolator 27 and an electron gun modulator 28. An RF-circuit 29 provides a constant level of microwave power within pulse duration $t_{RF}$. Electron gun 23, driven by e-gun modulator 28, provides an electron beam 220 characterized by a two-level injection current pulse 210 (also referred to herein as "the pulse") into accelerating system 20 with a total duration $t_p \leq t_{RF}$. Injection current pulse 210 may also be referred to herein as "injection current," and its amplitude, which, as defined above, corresponds to its instantaneous value of electron flux in mA, denoted $I_L$.

The first portion 212 of the pulse 210, characterized by a higher amplitude of the injection current $I_L$ due to higher beam loading, creates a low energy portion of the beam pulse, where the low energy portion is designated by $W_L$. (For avoidance of ambiguity, it is to be noted that $W_L$ refers both to the low energy portion of the pulse, and to the value of the instantaneous endpoint energy characterizing the low energy portion of the pulse. The same applies, mutatis mutandis, to $W_H$, the high energy portion of the pulse.) The second portion 214 of the injection current pulse with lower amplitude $I_H$ produces a high energy portion of the beam pulse $W_H$. The "breaking point" of the pulse, which, as defined above, has the specialized meaning of the value of $t_L/t_H$, may be variable, within the scope of the present invention, thereby enabling dynamic control of the dose of emitted X-rays to cargo and environment. In accordance with certain embodiments of the present invention, the breaking point may advantageously be varied from pulse to pulse, rendering it a dynamically variable breaking point.

Figure 3:
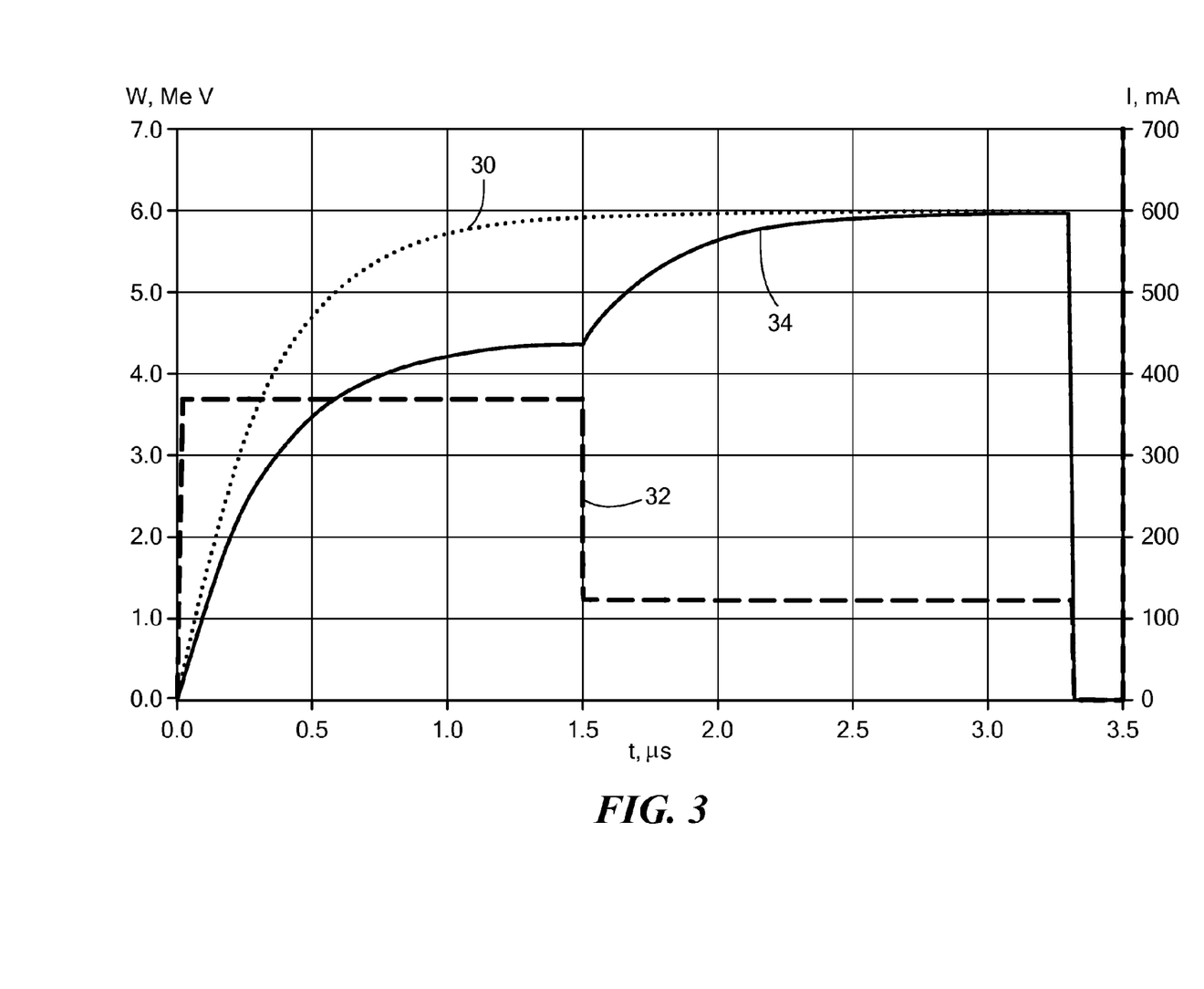
FIG. 3 depicts dependence of energy and current within a microwave pulse, in accordance with the same or another embodiment of the present invention.

Reference is made now to FIG. 3, where dependence of energy and current within a microwave pulse is depicted. Dashed line 32 shows the injection current, while solid line 34 represents the beam energy. Dotted line 30 shows energy dependence at constant current $I_H$, as previously discussed. As the result of different beam loading effect in the front and rear portion of the pulse, the beam has two distinct energy levels, and, in one embodiment: $W_{L(0.-1.5)\mu s}=3.9$ MeV and $W_{H(1.8-3.3)\mu s}=5.8$ MeV. As used herein, "energy level" refers to the instantaneous end-point energy of an ensemble of photons, distributed in energy according to an essentially Bremsstrahlung spectrum of photon energies, or otherwise.

Optimizing coupling coefficient $\beta_0$ of the accelerating structure for the parameters of the single energy beam is known in the prior art, and has been described in the Background Section above.

Figure 2:
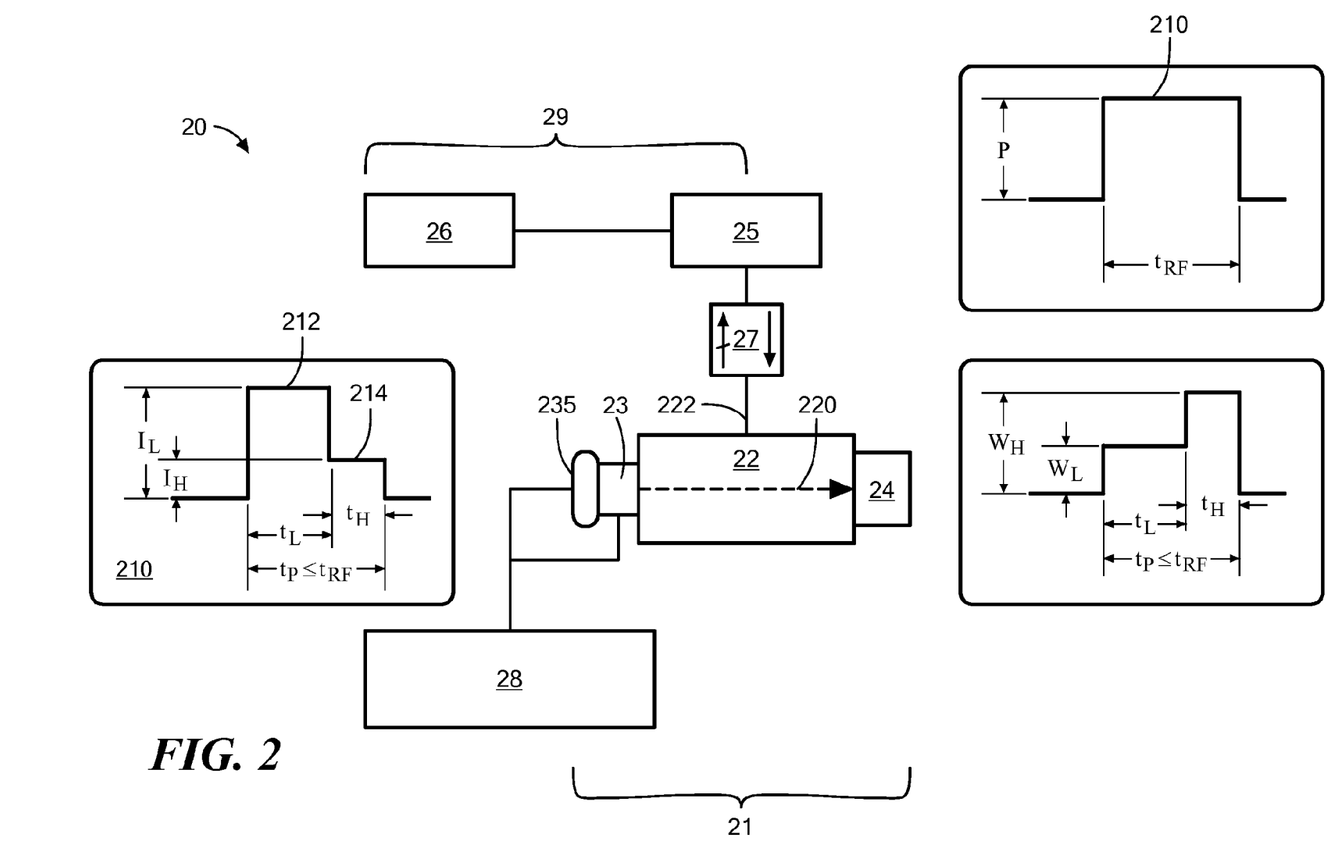
FIG. 2 shows a block diagram of an X-ray source employing an accelerating structure and modulated current injection and RF excitation. A dual-energy pulse is created by applying the $I_L$ and $I_H$ currents to two distinct portion of the single RF pulse.
Figure 4:
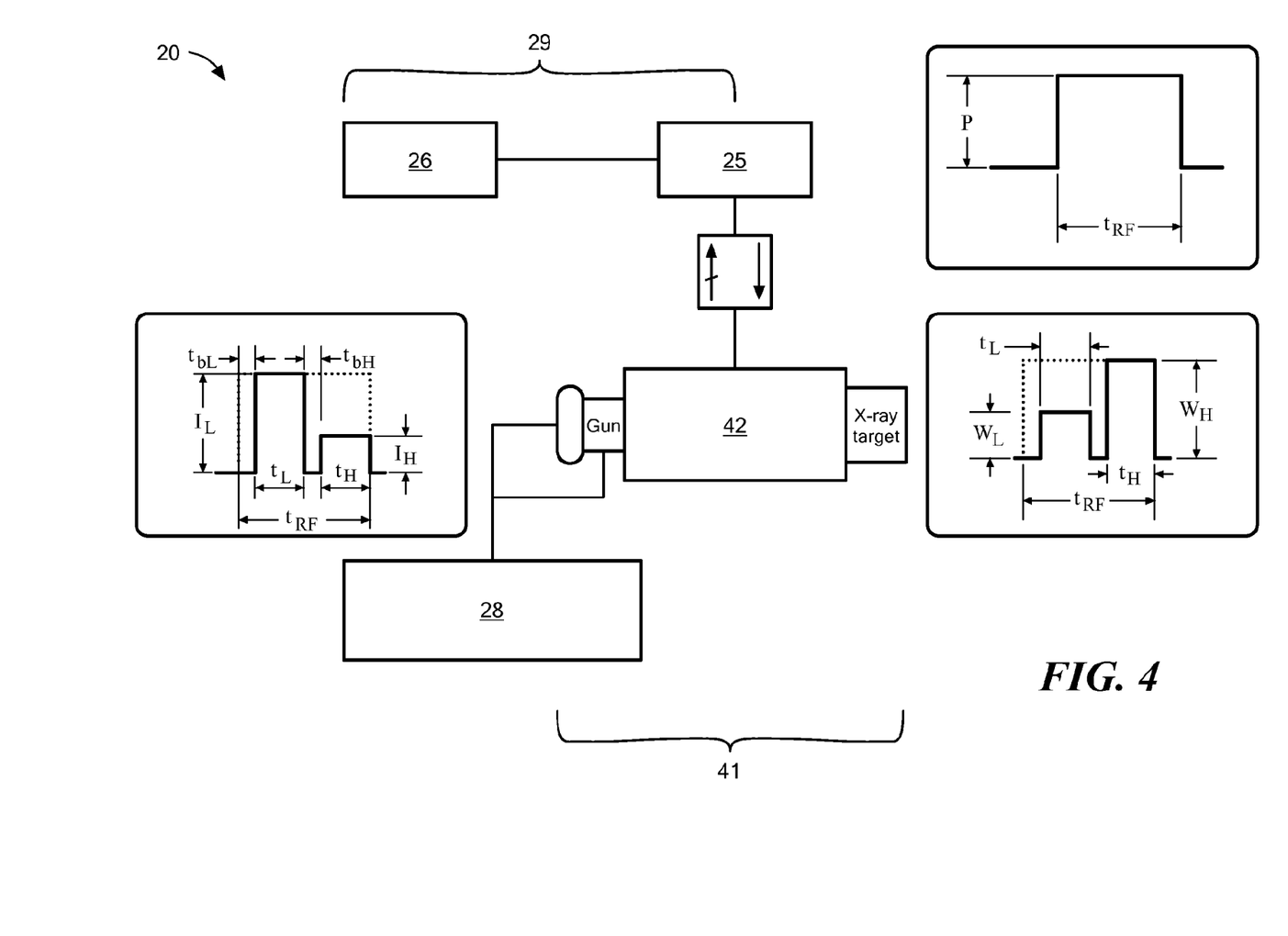
FIG. 4 shows a block diagram of an X-ray source employing a standing wave accelerating structure with modulated current injection and RF excitation, in accordance with the present invention.

In FIG. 4, a linac 21 is shown that is similar to the one shown in FIG. 2. The accelerating system 20 is based on a standing wave structure 42 (otherwise referred to herein as a "standing wave resonator"), the distinction of which with respect to a traveling wave structure has been laid out by Miller (1986). The coupling coefficient $\beta_0$ is chosen to be optimal at the current $I_L$, using the algorithm that was laid out in detail above. The value of $I_L$ is chosen to provide energy $W_L$, and this energy value $W_L$ remains constant over an entire sub-pulse duration if $I_L$ is applied with delay $t_{bL}$ with respect to the beginning of the RF pulse. Low energy current delay $t_{bL}$ is defined by Eq. (4) above. At the end of the low energy pulse (after $t_L$), the current turns off. The value of $I_H$ is chosen to provide $W_H$, and this energy level remains constant if $I_H$ current is applied with delay $t_{bH}$ counting from the end of low energy pulse $t_L$. The high energy pulse delay is defined by equation:

$$t_{bH} = \tau \cdot \ln\left(\frac{I_L}{I_H}\right). \tag{6}$$

In accordance with certain embodiments of the present invention, the $t_L$ point may be allowed to vary, thereby allowing the ratio $t_L/t_H$ (defined herein as the "breaking point") to be varied, and thus advantageously providing for dynamic control of the X-ray dose to cargo and environment.

The average current during the lower energy portion of the pulse will be referred to herein as the low energy current, and, mutatis mutandis, the average current during the higher energy portion of the pulse will be referred to herein as the high energy current.

The energies within each portion of the pulse will remain constant as long as the "low energy" current begins to be applied after a delay of $t_{bL}$, and as long as the "high energy" current is applied with a delay of $t_{bH}$. The constancy of energy within each of the LE and HE portions of the pulse is beneficial for material discrimination: the energy spectrum of X-ray beam remains constant hence no additional calibration point(s) is required.

A multi-energy pulse configuration, with greater than two distinct energies during the duration of each pulse, may be created in a similar fashion to that described above, using a standing wave accelerating structure.

The coupling coefficient $\beta_0$ is chosen to be optimal at current $I_1$, using the design algorithm described in detail above;

The current $I_1$ has the highest value in the sequence, it is applied first with delay of $t_{b1}$ (defined by Eqn. (4)) thus creating the lowest energy of the beam sequence.

The values of next current pulses $I_n$ are preferably created in descending order, thereby providing an ascending order of the beam energy levels.

In preferred embodiments of the invention, after each sub-pulse the current is turned off.

The current $I_n$ for n-th sub-pulse is applied with delay $t_{bn}$, given by:

$$t_{bn} = \tau \cdot \ln\left(\frac{I_{n-1}}{I_n}\right). \tag{7}$$

Each energy level end point $t_n$ may still be allowed to vary, thereby advantageously providing for dynamic control of the dose to cargo and environment. The energy within each portion will remain constant as long as the lowest $I_1$ current is applied after a delay of $t_{b1}$ (defined by Eqn. (4)) and each successive current step is applied with a delay of $t_{bn}$.

Figure 5:
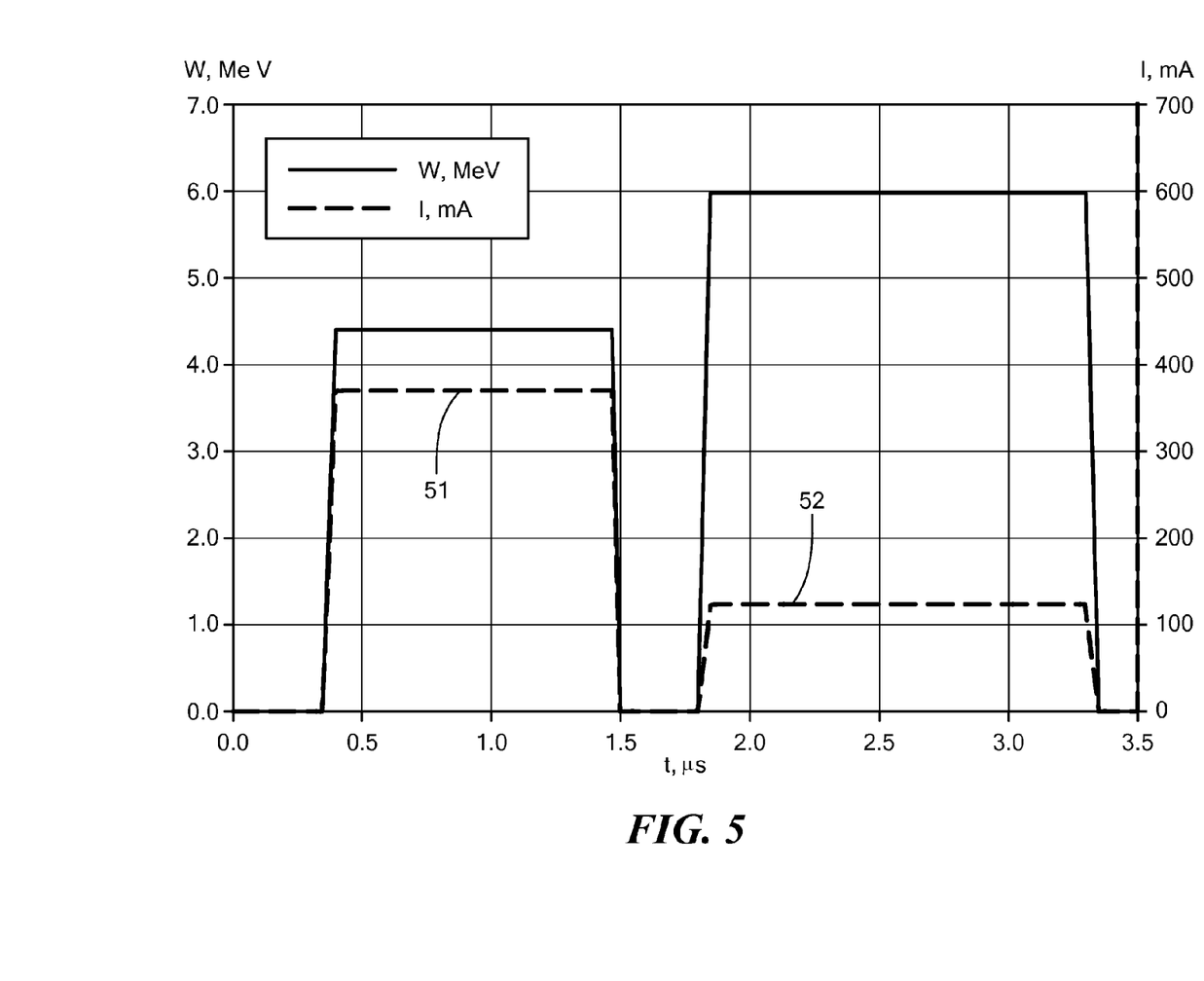
FIG. 5 shows a linac implementation with a dual-energy pulse created by applying the $I_1$, and $I_H$ currents with optimal delays, in accordance with an embodiment of the present invention.

An example of linac implementation with a dual-energy pulse that is created by applying the $I_L$ and $I_H$ currents with optimal delays is shown in FIG. 5. Parameters of the linac are identical to those that have been shown as an example in FIG. 3. Low energy current 51 is applied at an optimal delay of $t_{bL}\cong 0.34$ μs and is turned off after $t_L\cong 1.45$ μs. High energy current 52 is applied with delay of $t_{bH}\cong 0.36$ μs at 1.8 μs and is turned off at the end of microwave pulse.

Figure 6:
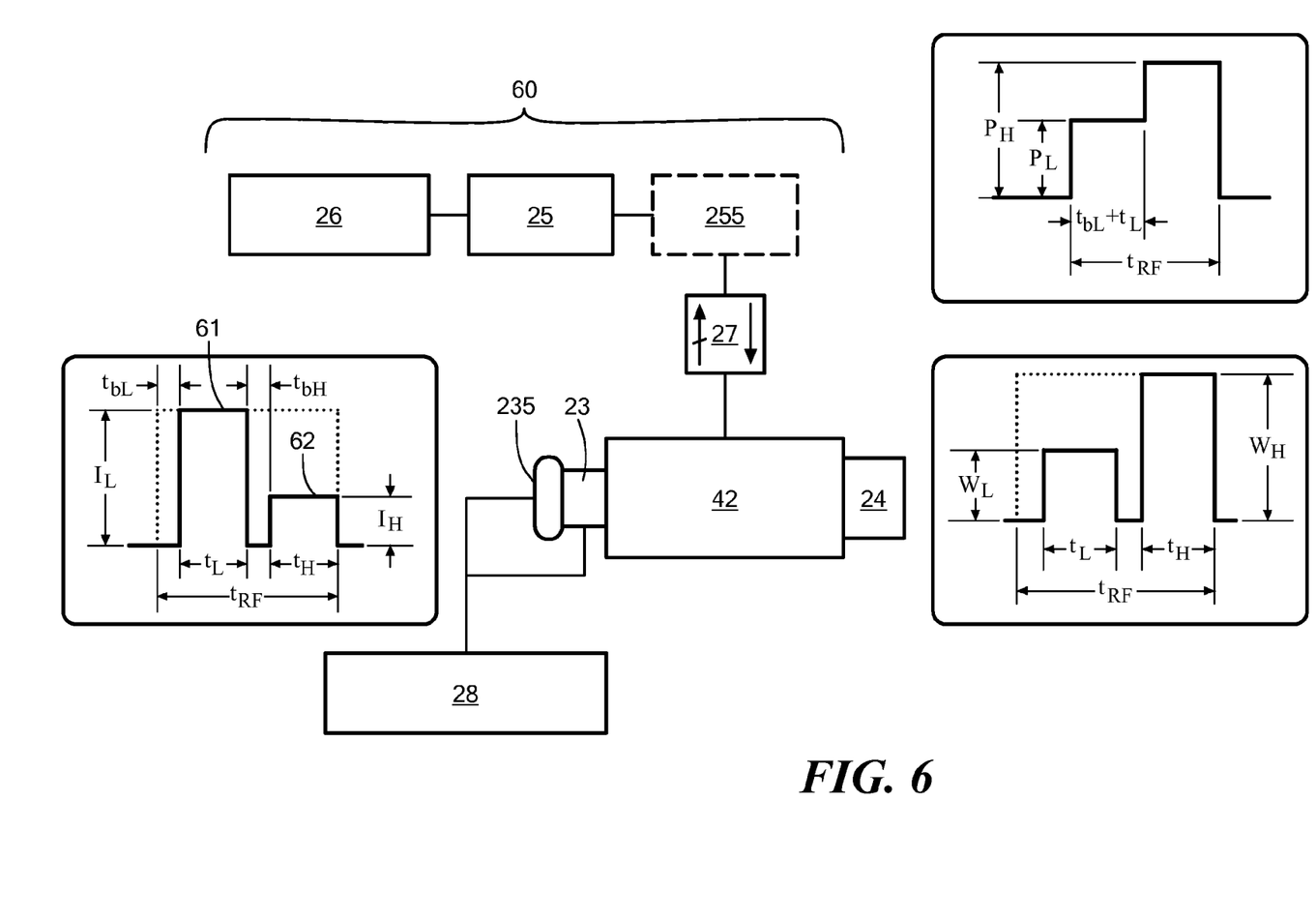
FIG. 6 shows a block-diagram of an intra-pulse dual-energy linac where the energy modulation is achieved by varying both input RF-power and injection current provided into a standing wave accelerating system, in accordance with an embodiment of the present invention.

FIG. 6 depicts a block-diagram of an intra-pulse dual-energy linac 60 where energy modulation is achieved by varying both input RF-power $P_H$ and $P_L$, as well as injection current $I_H$ and $I_L$ provided into the standing wave accelerating structure 42. Low energy current 61 and high energy current 62 are applied with optimum delays. RF-power modulation can be achieved by several known methods such as varying input voltage and current of RF-source 25, or varying the input RF-power to the RF-source by means of RF-source modulator 26, or else by manipulating output power of the RF-source with switches or regulators, generically referred to herein as RF modulator 255.

In accordance with another embodiment of the present invention, an ascending order of energy levels is created with constant amplitudes. As used herein, the term "amplitude" refers to an instantaneous flux of electrons within electron beam. In this embodiment, A corresponding ascending sequence of RF-power levels and descending sequence of injection current pulses is applied.

The coupling coefficient $\beta_0$ is chosen to be optimal at current $I_L$, using the design algorithm described in detail above.

A low energy current delay $t_{bL}$, is as defined by Eqn. (4).

A high energy current delay $t_{bH\_a}$ is as determined using $$t_{bH\_a} = \tau \cdot \left[ \ln\left(\frac{I_L}{I_H}\right) + \ln\left(1 + \frac{2 \cdot \beta_0}{\beta_0 - 1}\sqrt{\frac{P_H}{P_L} - 1}\right)\right]. \quad (8)$$

$P_H$ and $P_L$ refer, respectively, to RF power applied during high energy and low energy portions of the beam current pulse.

While using power modulation, certain benefits may be achieved by creating a descending order of energy levels with constant amplitudes. For implementing such the descending sequence:

A corresponding descending sequence of RF-power levels and ascending sequence of injection current pulses is applied.

$\beta_0$ is chosen to match the accelerating system with low energy current using design algorithm described in detail above.

A high energy current delay $t_{bH}$ is determined using Eqn. (3) using $I_H$ and $P_H$ A low energy current delay $t_{bL\_d}$ is determined using $$t_{bL\_d} = \tau \cdot \left[\ln\left(\frac{I_H}{I_L}\right) + \ln\left(1 + \frac{\sqrt{4\beta_0 r L P_H}}{I_H r_L}\sqrt{1 - \frac{P_L}{P_H}}\right)\right] \quad (9)$$

Figure 7:
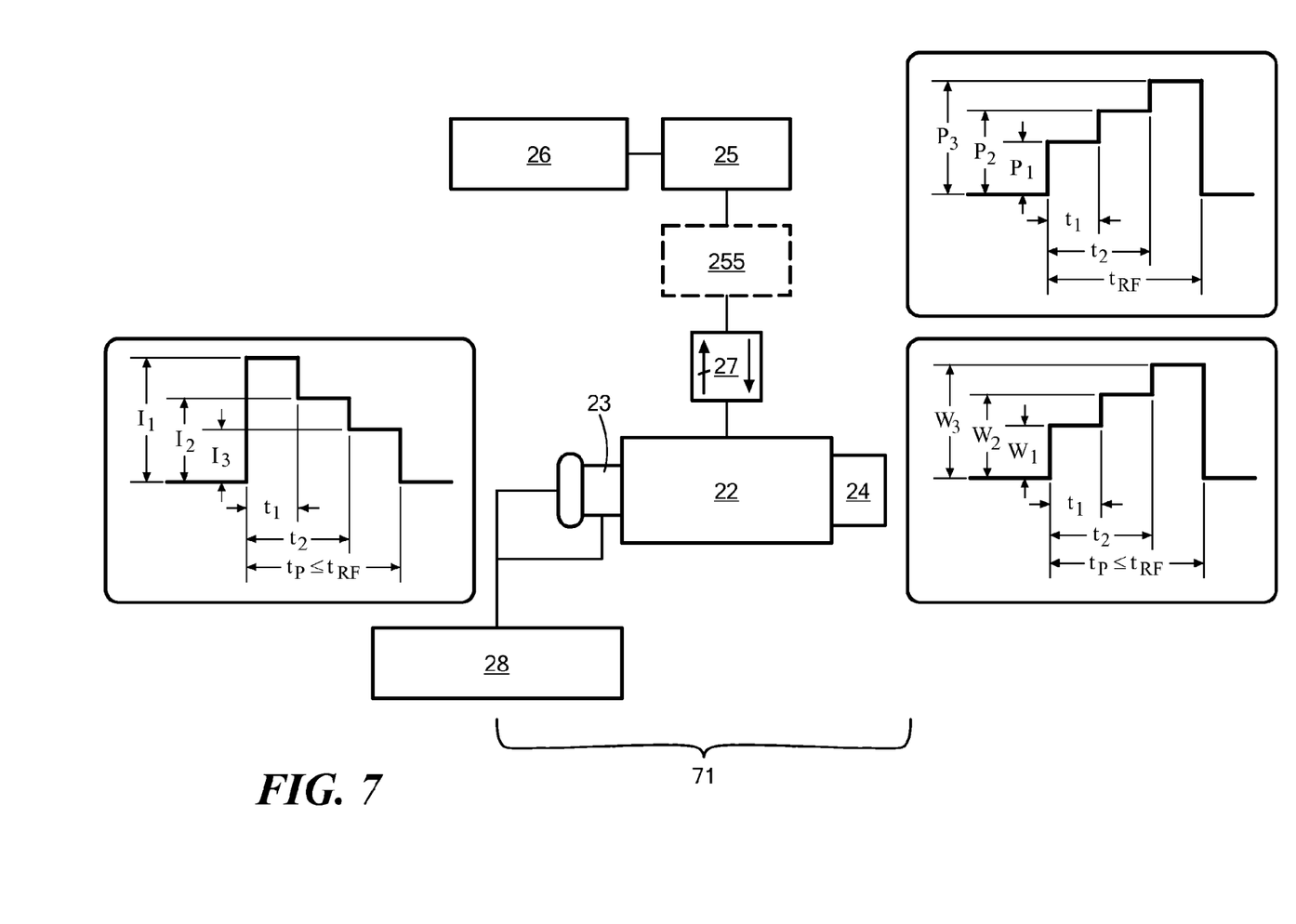
FIG. 7 shows an example of creating an ascending order of beam energy steps $W_n$ by applying an ascending order of RF-power levels $P_n$ with corresponding descending order of injection currents $I_n$, in accordance with an embodiment of the present invention.

The block-diagram of the linac 71 depicted in FIG. 7 demonstrates the option of a linac with multi-energy pulses that is created by modulating both input RF-power and injection current. Linac 71 includes similar subsystems to those presented in FIGS. 2 and 4. FIG. 7 shows an example of creating an ascending order of beam energy steps $W_n$ by applying an ascending order of RF-power levels $P_n$ with a corresponding descending order of injection currents $I_n$.

Embodiments of the invention described above are intended to be merely exemplary; numerous variations and modifications will be apparent to those skilled in the art. All such variations and modifications are intended to be within the scope of the present invention as defined in any appended claims.

I claim:

1. A method for generating a multiple-energy X-ray pulse, the method comprising:
    generating a beam of electrons with an electron gun, wherein a temporal profile of the electron gun is characterized by at least two distinct levels of the amplitude of electron beam $I_n$;
    modulating the beam of electrons prior to injection into an accelerating structure to achieve at least a first specified beam current amplitude and a first specified beam current temporal profile, and a second specified beam current amplitude and a second specified beam current temporal profile, wherein the beam of electrons is characterized by an electron beam pulse duration and the accelerating structure includes a standing wave resonator;
    applying to the accelerating structure a radio frequency field with a specified RF field amplitude and a specified RF temporal profile characterized by an RF pulse duration;
    injecting the beam of electrons at a first specified beam current amplitude and then at the second specified beam current amplitude after a specified delay, in such a manner as to achieve at least two distinct endpoint energies of electrons accelerated within the accelerating structure during a course of a single RF-pulse;
    optimizing a coupling coefficient between an RF source and the accelerating structure so as to achieve zero RF power reflection at the first specified beam current amplitude or the second specified beam current amplitude, wherein the RF source provides a constant level of RF-power and wherein the coupling coefficient of accelerating resonator $\beta_o$ is chosen to be optimal at a first level of beam current $I_1$;
    accelerating the beam of electrons with the radio frequency field within the accelerating structure to produce accelerated electrons; and
    impinging the accelerated electrons upon a target for generating X-rays by Bremsstrahlung.

2. A method in accordance with claim 1, wherein the electron beam pulse duration is shorter than the RF pulse duration by a sum of onset delays, wherein the sum is defined by a filling time of the accelerating structure.

3. A method in accordance with claim 1, wherein the first specified beam current temporal profile and the specified RF temporal profile begin substantially contemporaneously.

4. A method in accordance with claim 1, wherein the beam of electrons is characterized by an amplitude of injection current, and wherein the amplitude of injection current decreases during the multiple-energy X-ray pulse.

5. A method in accordance with claim 1, wherein an end-point energy characterizing the beam of electrons increases during the multiple-energy X-ray pulse.

6. A method in accordance with claim 1, wherein applying the RF field includes modulating an RF source.

7. A method in accordance with claim 6, wherein modulating the RF source includes varying at least one of an input voltage and an input current to the RF source.

8. A method in accordance with claim 1, wherein applying the RF field includes modulating an RF modulator disposed between an RF source and the accelerating structure while the RF-source provides a constant level of power at a constant frequency.

9. A method in accordance with claim 1, wherein a portion of the multiple-energy x-ray pulse greater than 1 MeV is characterized by a lower electron beam flux than a lower energy portion of the multiple-energy X-ray pulse.

10. A method in accordance with claim 1,
    wherein each amplitude of the at least two distinct levels of amplitude is created in temporally descending order.

11. A method in accordance with claim 1, wherein breaking points of said at least two distinct levels include breaking points that are dynamically variable.

12. A method in accordance with claim 1,
    wherein a first portion of an electron beam current pulse starts with an optimum delay ($t_{b1}$) relative to a beginning of an RF pulse;
    wherein said electron beam current pulse ends at a specified time ($t_1$); and
    wherein each successive portion of the electron beam current pulse is characterized by a distinct level $I_n$ and starts with a delay $$t_{bn} = \tau \cdot \ln\left(\frac{I_{n-1}}{I_n}\right)$$

corresponding to an end of a previous pulse $t_{n-1}$, with $\tau$ representing a decay time of the accelerator structure.

13. A method in accordance with claim 1, wherein an end point of each pulse $t_n$ includes a dynamically variable end point.

14. A method in accordance with claim 1, further comprising:
supplying an RF-power pulse to the accelerating structure at two distinct energy levels, $P_L$, $P_H$, corresponding, respectively, to a lower energy portion and a higher energy portion of the beam of electrons; wherein the electron gun temporal profile is characterized by two distinct levels of the amplitude of electron beam, $I_L$, $I_H$, corresponding, respectively, to beam current levels for achieving the lower and the higher energy portion of the beam of electrons; and
optimizing the coupling coefficient of accelerating resonator $\beta_0$ based upon parameters of the lower energy beam.

15. A method in accordance with claim 1, further comprising:
forming an ascending order of two distinct X-ray energy levels by applying a corresponding ascending sequence of RF-power levels and a descending sequence of injection current pulses;
delaying a first component of the pulse by a low energy current delay $t_{bL}$ defined by $$t_{bL} = \tau \cdot \ln\left(\frac{2 \cdot \beta_0}{\beta_0 - 1}\right);$$

and
delaying a second component of the pulse by a high energy current delay $t_{bH\_a}$ defined by $$t_{bH\_a} = \tau \cdot \left[\ln\left(\frac{I_L}{I_H}\right) + \ln\left(1 + \frac{2 \cdot \beta_0}{\beta_{0-1}}\sqrt{\frac{P_H}{P_L} - 1}\right)\right]$$

wherein the first component of the pulse is at a lower energy than the second component of the pulse.

16. A method in accordance with claim 1, further comprising:
forming a descending order of two energy levels by applying a corresponding descending sequence of RF-power levels and an ascending sequence of injection current pulses;
delaying a first component of the pulse by a high energy current delay $t_{bH}$ defined by equation $$t_{bH} = \tau \cdot \ln\left(\frac{\sqrt{4\beta_0 rLP_H}}{I_H rL}\right);$$

and
delaying a second component of the pulse current delay $t_{bL\_d}$ is defined by $$t_{bL\_d} = \tau \cdot \left[\ln\left(\frac{I_H}{I_L}\right) + \ln\left(1 + \frac{\sqrt{4\beta_0 rLP_H}}{I_H rL}\sqrt{1 - \frac{P_L}{P_H}}\right)\right]$$

wherein the first component of the pulse is at a higher energy than the second component of the pulse.

* * * * *